US008457348B2

(12) United States Patent
Wong et al.

(10) Patent No.: US 8,457,348 B2
(45) Date of Patent: Jun. 4, 2013

(54) PRODUCING STRUCTURE-BASED ASCII PICTURES

(75) Inventors: Tien-Tsin Wong, Hong Kong (CN); Xuemiao Xu, Guangdong Province (CN); Linling Zhang, Hong Kong (CN)

(73) Assignee: The Chinese University of Hong Kong, Hong Kong (CN)

( * ) Notice: Subject to any disclaimer, the term of this patent is extended or adjusted under 35 U.S.C. 154(b) by 406 days.

(21) Appl. No.: 12/825,244

(22) Filed: Jun. 28, 2010

(65) Prior Publication Data
US 2011/0317919 A1    Dec. 29, 2011

(51) Int. Cl.
*G06K 9/46* (2006.01)
(52) U.S. Cl.
USPC .............................. 382/100; 382/170; 382/203
(58) Field of Classification Search
USPC ........................... 382/168, 170, 203, 190, 100
See application file for complete search history.

(56) References Cited

U.S. PATENT DOCUMENTS

2009/0115797 A1* 5/2009 Poupyrev et al. ............. 345/619

FOREIGN PATENT DOCUMENTS
JP          2010074324 A  *  4/2010

OTHER PUBLICATIONS

Schlosser et al. "Fast Shape Retrieval Based on Shape Contexts." Proceedings of 6th International Symposium on Image and Signal Processing and Analysis, Sep. 16, 2009, pp. 293-298.*
English Translation of JP2010074324.*
Arkin et al. "An Efficiently Computable Metric for Comparing Polygonal Shapes." *IEEE Transactions on Pattern Analysis and Machine Intelligence*. 13(3):209-216 (1991).
Bayer. "An Optimum Method for Two-Level Rendition of Continuous-Tone Pictures." *IEEE International Conference on Communications*. 1:11-15 (1973).
Belongie et al. "Shape Matching and Object Recognition Using Shape Contexts." *IEEE Transactions on Pattern Analysis and Machine Intelligence*. 24(24):509-522 (2002).
Cohen et al. "Tracking Points on Deformable Objects Using Curvature Information." *Proceedings of the Second European Conference on Computer Vision*. 458-466 (1992).
Crawford. "ASCII Graphical Techniques v1.0." 1994.
Goh. "Strategies for Shape-Matching Using Skeletons." *Computer Vision and Image Understanding*. 110:326-345 (2008).
Kang et al. "Coherent Line Drawing." *Proc. ACM Symposium on Non-photorealistic Animation and Rendering*. pp. 43-50, San Diego, CA (2007).
Milios. "Shape Matching using Curvature Processes." *Computer Vision, Graphics, and Image Processing*. 47(2):960-963 (1989).
Mori et al. "Efficient Shape Matching Using Shape Contexts." *IEEE Transactions on Pattern Analysis and Machine Intelligence*. 27(11):1832-1837 (2005).
O'Grady et al. "Automatic ASCII Art Conversion of Binary Images Using Non-Negative Constraints." *Signals and Systems Conference* (2008).
Randall. "FAQ: New to ASCII Art? Read Me First!" Archive ascii-art/faq. 2003.
Sundar et al. "Skeleton Based Shape Matching and Retrieval." *Shape Modeling International*. 2003.
Torsello et al. "A Skeletal Measure of 2D Shape Similarity." *Computer Vision and Image Understanding*. 95(1). pp. 1-12. (2004).

(Continued)

*Primary Examiner* — Jon Chang
(74) *Attorney, Agent, or Firm* — Knobbe Martens Olson & Bear LLP

(57) ABSTRACT

Provided are methods and devices for producing an ASCII picture from a vector outline image. The method comprises rasterizing the vector outline image into a plurality of grid cells, at least one of which has a reference image; matching each reference image with an ASCII character based on log-polar histograms thereof; and gathering all matched ASCII characters to form the ASCII picture.

21 Claims, 14 Drawing Sheets

OTHER PUBLICATIONS

Wang et al. "Image Quality Assessment: From Error Visibility to Structural Similarity." *IEEE Transactions on Image Processing.* 13(4):600-612 (2004).

Zahn et al. "Fourier Descriptors for Plane Closed Curves." *IEEE Transactions on Computers.* C21(3):269-281 (1972).

* cited by examiner

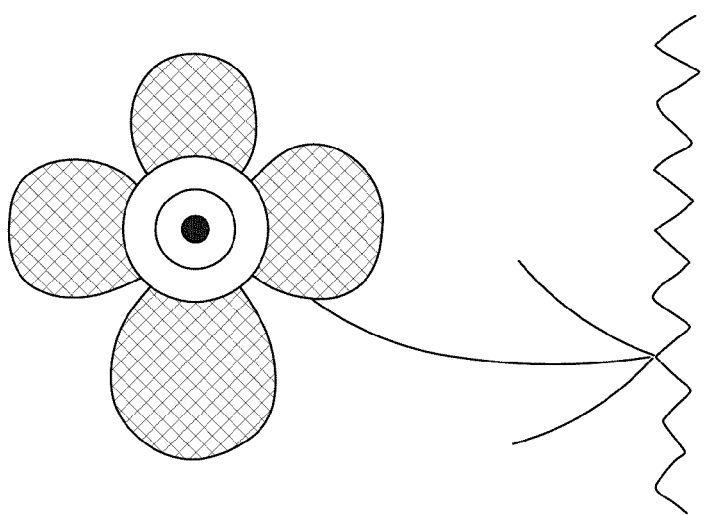
*FIG. 1(a)*
*FIG. 1(b)*
*FIG. 1(c)*

PRODUCING STRUCTURE-BASED ASCII PICTURES

TECHNICAL FIELD

The present application refers to ASCII arts, in particular, to methods and devices for producing structure-based ASCII pictures.

BACKGROUND

Generally, ASCII pictures are divided into two major categories, i.e., tone-based ASCII pictures and structure-based ASCII pictures. The tone-based ASCII pictures maintain an intensity distribution of a reference image, while the structure-based ASCII pictures capture a major structure of image content. For example, with reference to FIGS. 1(a)-1(c), a reference image in FIG. 1(a) may be represented by a tone-based ASCII picture as shown in FIG. 1(b) or a structure-based ASCII picture as shown in FIG. 1(c). Currently, there are some existing computational methods available for handling the tone-based ASCII pictures. But, currently satisfactory structure-based ASCII pictures are mostly created by hand. There is no tool capable for producing structure-based ASCII pictures in an efficient and facile way.

For the structure-based ASCII pictures, a major challenge is an inability to depict unlimited image contents with limited character shapes and the restrictive placement of characters over character grids. Two matching strategies usually employed by ASCII artists for producing structure-based ASCII pictures are shown in FIGS. 2(a)-2(c). FIG. 2(a) shows an overlapping image between an edge map of the reference image of FIG. 1(a) and the structured-based ASCII picture of FIG. 1(c). Usually, in order to raise a chance to match the reference image with appropriate characters, artists tolerate the misalignment between characters and the reference image structure as shown in FIG. 2(b), and even intelligently deform the reference image as shown in FIG. 2(c). The challenge of shape matching in ASCII art application is actually a general pattern recognition problem. In applications such as ASCII art and optical character recognition (OCR), the shape matching should be able to tolerate the misalignment and the difference in transformation (such as scale, translation and orientation) shall be also considered. For instance, in recognizing characters "O" and "º", both the scale and the translation shall be considered; while in recognizing characters "6" and "9", the orientation shall be considered. Unfortunately, existing shape similarity metrics used for shape matching are either alignment-sensitive or transformation-invariant, and hence not applicable.

SUMMARY

In the present application, a method for generating a structure-based ASCII picture to capture a major structure of a reference image is proposed, in which an alignment-insensitive shape similarity metric is used. The proposed similarity metric tolerates the misalignment while accounts for the difference in transformation. In addition, a constrained deformation of the reference image may be introduced to increase the chance of character matching. Given an input and a target text resolution, the ASCII picture generation may be formulated as an optimization of minimizing the shape dissimilarity and deformation.

The proposed techniques aim to provide a creative tool for producing structure-based ASCII arts which can only be created by hand currently. This tool need few user interactions and can generate cool ASCII work in a few minutes, and its quality is comparable to people's handwork. This is a premier system to provide ASCII fans with an efficient and facile way of structure-based ASCII art generation.

According to an aspect of the present application, a method for producing an ASCII picture from a vector outline image, comprises: rasterizing and dividing the vector outline image into a plurality of grid cells, at least one of which has a reference image; matching each reference image with an ASCII character based on log-polar histograms thereof; and gathering all matched ASCII characters to form the ASCII picture.

According to another aspect of the present application, a device for producing an ASCII picture from a vector outline image, comprises: a rasterizing module configured to rasterize and divide the vector outline image into a plurality of grid cells, at least one of which has a reference image; a matching module configured to match each reference image with an ASCII character based on log-polar histograms thereof; and a generating module configured to gather all matched ASCII characters to generate the ASCII picture.

BRIEF DESCRIPTION OF THE DRAWINGS

FIGS. 1(a), 1(b), and 1(c) illustrate a tone-based ASCII picture and a structure-based ASCII picture generated based on a reference image;

DETAILED DESCRIPTION OF CERTAIN INVENTIVE EMBODIMENTS

Hereinafter, illustrative embodiments according to the present application will be described with reference to the accompanying drawings.

Embodiment 1

Figure 2C:
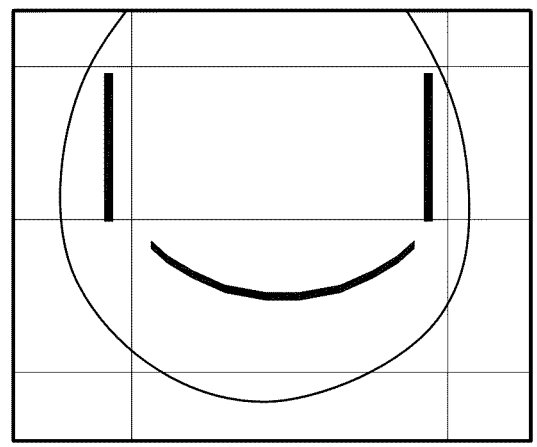
FIGS. 2(a), 2(b), and 2(c) illustrate two matching strategies usually employed by ASCII artists.
Figure 2B:
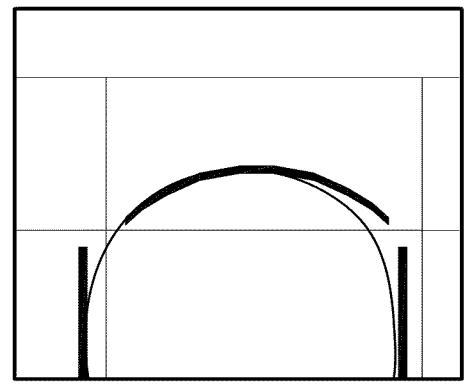
Figure 2A:
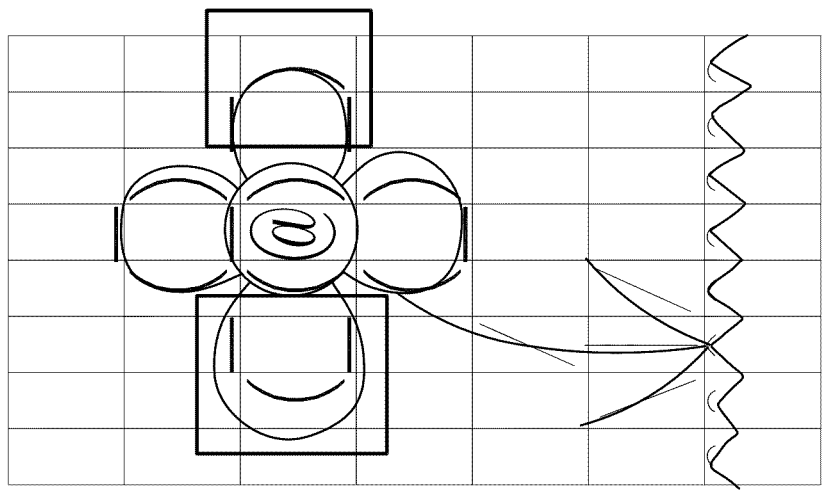
Figure 3:
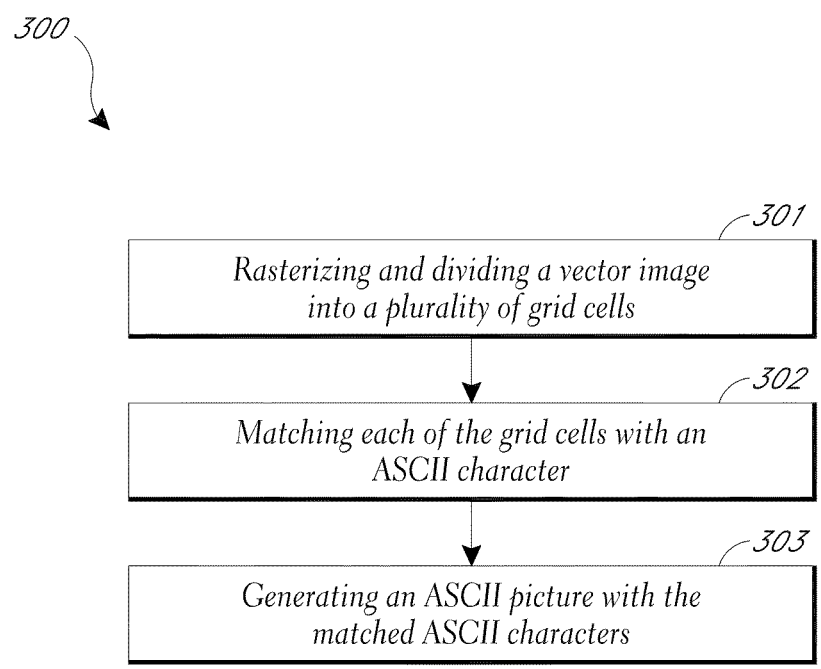
FIG. 3 illustrates a flowchart of the method according to a first embodiment of the present application.
Figure 4:
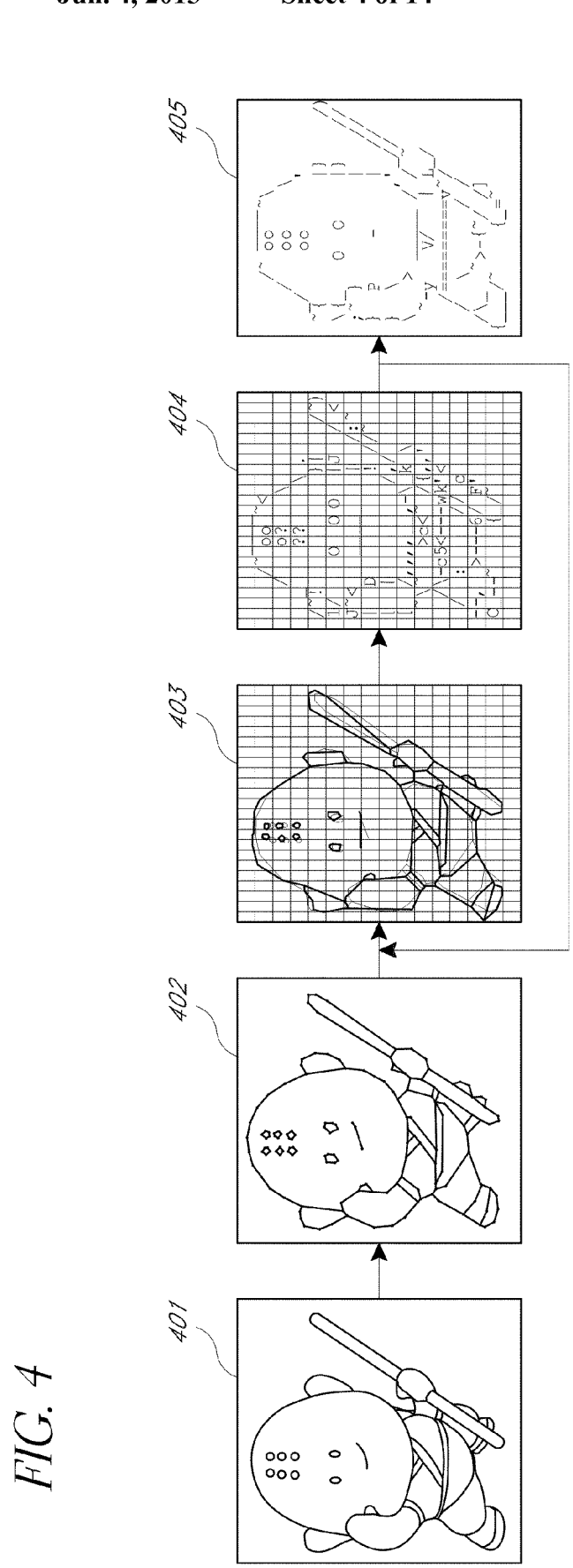
FIG. 4 illustrates pictures formed during a process of the method according to an embodiment of the present application.

Referring to FIG. 3, a method 300 for producing an ASCII picture according to a first embodiment of the present application may comprise the following steps. In step 301, an input vector outline image may be rasterized and divided into a plurality of grid cells. In step 302, image contents in each of the grid cells are matched with an ASCII character by using a proposed alignment-insensitive shape similarity metric. Then, the matched ASCII characters are gathered to form the ASCII picture in step 303. In the method, the image to be processed may be a vector outline image containing only polylines. Other image such as a photograph may be converted into an outline image by a known naive edge detection method or a sophisticated line art generation method, and then vectorized into a vector outline image. For example, an image 401 as shown in FIG. 4 may be converted and vectorized into a corresponding vector outline image 402. The steps of the rasterizing and matching will be described in detail as below.

Rasterizing at Step 301

According to an embodiment of the present application, the vector outline image may be rasterized and divided into a plurality of grid cells based on a target resolution, as well as a width and a height of ASCII characters to be used. For example, the target resolution is assumed to be $R_w \times R_h$, where $R_w$ and $R_h$ are maximum numbers of ASCII characters in an ASCII picture to be output along horizontal and vertical directions thereof, respectively. In general, ASCII character fonts may have varying thickness and varying character width. After a font and a size of characters to be used are selected by a user, a width $T_w$ and a height $T_h$ of the characters to be used are determined. An aspect ratio $\partial = T_h/T_w$ of the characters is also determined. In addition, the font thickness of the characters may be ignored via a centerline extraction, so that only fixed-width character fonts with a fixed aspect ratio $\partial = T_h/T_w$ are handled. Both the input polylines and the characters are rendered with the same line thickness so as to focus only on the shapes during matching. W and H. as $R_h = \lceil H/(\partial \lceil W/R_w \rceil) \rceil$. Thus, the resolution can be solely determined by a single variable $R_w$ as $R_h = \lceil H/(\partial \lceil W/R_w \rceil) \rceil$, where W and H are the width and height of the input image in a unit of pixels which are available when the input image is given, and the variable $R_w$ is specified by the user. With the above parameters, the text resolution in vertical direction can be calculated. Hence, the vectorized picture is first scaled and rasterized to a domain of $T_w R_w \times T_h R_h$. Each of the $T_w R_w \times T_h R_h$ grid cells is treated to match a corresponding character respectively.

Matching at Step 302

Figure 5C:
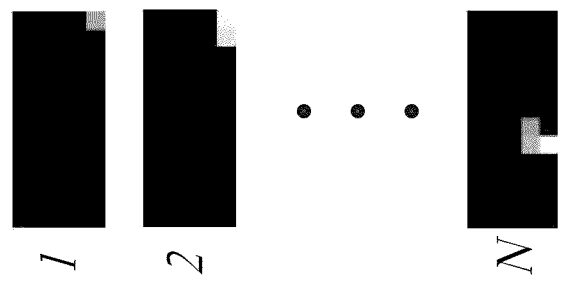
FIGS. 5(a), 5(b), and 5(c) illustrate an alignment-insensitive shape similarity metric used in the present application.
Figure 5B:
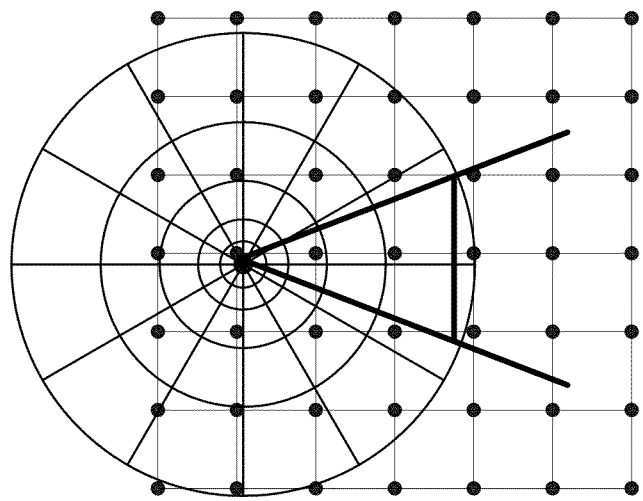
Figure 5A:
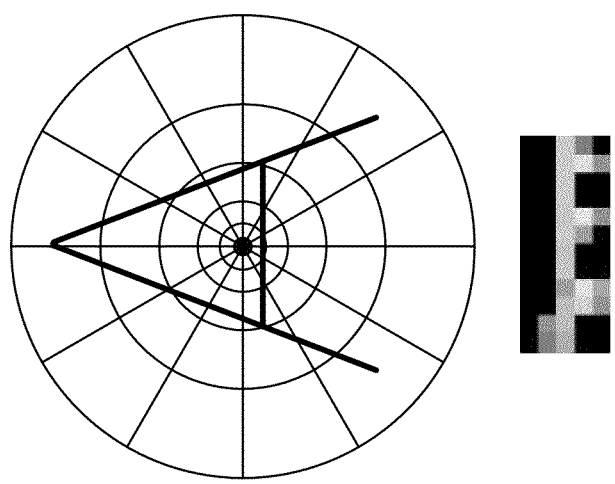

For the ease of description, the image content in each of the grid cells to be matched with an ASCII character may also be referred as a reference image. According to an embodiment, a log-polar histogram is used. In particular, after the vector outline image is rasterized and divided into a plurality of grid cells, each of the grid cells is sampled and the log-polar histogram of each sample point in the grid cell is determined. The log-polar histogram may characterize a shape feature in a local neighborhood of the sample point, covered by a log-polar window. As shown in FIG. 5(a), the log-polar window is a circle containing 60 bins. The bins uniformly partition the local neighborhood in the log-polar space. For each bin, a sum of pixel grayness in the bin is calculated and referred as a component in the histogram. As the bins are uniform in log-polar space, the histogram is more sensitive to positions of nearby points than to those farther away. Moreover, for each sample point, since only the grayness of pixels within a same bin matters, the histogram is inherently insensitive to small shape perturbations, and thus leads to the tolerance of its misalignment.

During the pixel grayness summation, a black pixel has a grayness of 1 while a white pixel has a grayness of 0. A bin value $h_{i,k}$ of the k-th bin according to an i-th sample point p may be calculated as $h_{i,k} = \Sigma_{(q-p) \in bin(k)} I(q)$, where p is the i-th sample point which is in the center of the log-polar window; q is a position of a current considered pixel; (q−p) is a relative position of the point q to the center p of the log-polar window; I(q) returns a grayness at the point q. Thus, a feature vector $h_i$ including all the bin values $h_{i,k}$ according to the i-th sample point p may be formed. For example, if there is 60 bins for each sample point, the feature vector $h_i$ is formed to contain 60 bin values $h_{i,k}$ (k=1, . . . , 60).

Similarly, each ASCII character is sampled and the log-polar histogram of each sample point in the ASCII character is determined. Both the reference image and the ASCII character are sampled with a same sample pattern. For each sample point, a log-polar histogram is measured. In order to account for a transformation (or position) difference, in an embodiment, the reference image and the ASCII character are sampled with a same grid layout pattern. Referring to FIG. 5(b), N points over the image in a grid layout are sampled. The feature vectors (histograms) of the sample points are then concatenated to describe the shape, as shown in FIG. 5(c).

Thus, the shape dissimilarity between the reference image and an ASCII character may be obtained by comparing their feature vectors on a point-by-point basis. The ASCII character whose feature vector is closest to that of a certain grid cell may be selected to match the grid cell.

According to an embodiment, the shape dissimilarity may be measured by comparing their feature vectors in a point-by-point basis, given by $$D_{AISS}(S, S') = \frac{1}{M} \sum_{i \in N} \|h_i - h_i'\|, \quad (1)$$

where $h_i(h_i')$ is the feature vector of the i-th sample point on the reference image S (the ASCII character S'); M=(n+n') is the normalization factor, n(n') is the total grayness of the shape S(S'). The shape S' minimizing the shape dissimilarity with the shape S may be selected to match the shape S. Hereinafter, the shape dissimilarity for the j-th cell in the vector outline image and its corresponding ASCII character is also denoted as $D_{AISS}^j$.

According to such matching, the normalization factor counteracts the influence of absolute grayness, and the global transformation of the shape is accounted. Besides, the log-polar histogram may natively account for orientation. All log-polar histograms may share a same scale, so that the scale is also accounted. Thus, the method according to the present application is alignment-insensitive and transformation-variant.

In the above, the histograms are empirically constructed with 5 bins along the radial axis in log space and 12 bins along the angular axis. Thus totally 60 bins are included in a histogram. The radius of the coverage window is selected to be about half of the shorter side of a character. The number of sample points N equals to $(S_w/2) \times (S_h/2)$ where $S_w$ and $S_h$ are the width and height of the image in a unit of pixels, denoting the total number of pixels in horizontal and vertical direction of image, respectively. To suppress the aliasing due to the discrete nature of bins, the image may filtered by a Gaussian kernel, for example, of a size of 7×7, before measuring the shape feature.

The metrics according to the present application has been evaluated by comparing with three commonly used metrics, including the classical shape context (a translation- and scale-invariant metric), SSIM (an alignment-sensitive, structure similarity metric), and the RMSE (root mean squared error) after blurring. For the last metric, RMSE is measured after the compared images are blurred by a Gaussian kernel of a size 7×7 for better performance.

Figure 6:
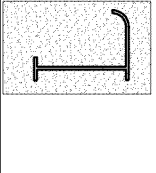
FIG. 6 illustrates comparison of the method according to the present application with three commonly used metrics.

Referring to FIG. 6, four different shapes (the first column) are queried. For each metric, a best-matched character is searched from a set of 95 printable ASCII characters. From the matching results, the shape context metrics emphasizes on the shape and ignores the position (as demonstrated by queries 2 to 4). The SSIM and RMSE metrics maximize the overlapping area between the query image and character, while paying less attention on the shape (demonstrated by queries 1 and 3) due to their alignment sensitive nature. In contrast, the method according to the present application strikes for a balance between the shape and the position in all results. The query of a long center-aligned horizontal line (query 4) well demonstrates the advantage of the method of the present application. The shape context metrics maximizes the shape similarity, ignores the large displacement, and chooses the longer underscore character "_" to match with the long line. The SSIM and RMSE metrics match the shape with an equal sign "=" because its lower line overlaps with the query image. The method of the present application pays attention to the shape (a single line), tolerates for a slight misalignment, and chooses a shorter hyphen "-" as the best matched character.

Embodiment 2

According to a second embodiment of the present application, the reference image is deformed slightly so as to raise the chance of character matching.

Figure 9:
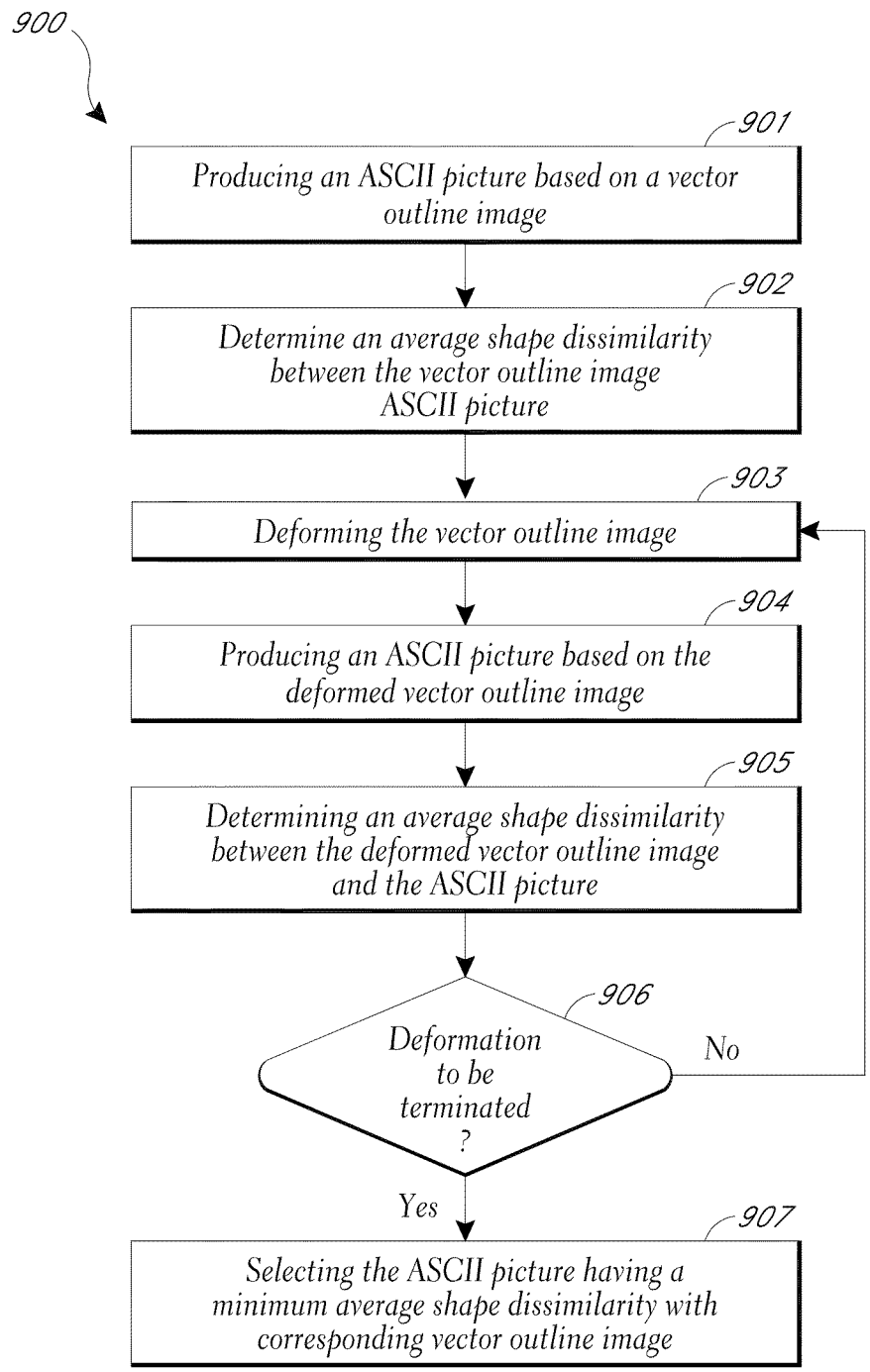
FIG. 9 illustrates a flowchart of the method according to a second embodiment of the present application.

Referring to FIG. 9, a flow chart of the method 900 according to the second embodiment is shown. At step 901, an ASCII picture is produced based on an input vector outline image. This step may be performed according to steps 301-303 of the first embodiment as stated above. As can be seen, the shape dissimilarity between each grid cell of the vector outline image and the matched ASCII character in the produced ASCII picture is obtained in the step 901. Then, in step 902, average shape dissimilarity between the vector outline image and the ASCII picture may be determined through dividing the total shape dissimilarity of all grid cells by the number of non-empty grid cells in the image. At step 903, the vector outline image is deformed slightly. For example, such deformation may be performed by iteratively adjusting vertex positions of the polylines. As shown in FIG. 4, the image 403 is a deformed image. In this case, for each grid cell in each formed ASCII picture, feature vectors for sample points therein may be determined and the shape dissimilarity between the reference image in the grid cell and ASCII characters may be obtained. As stated above, matched characters for each grid cell in the deformed image are found and gathered to form an ASCII picture corresponding to the deformed image. Thus, a corresponding ASCII picture is produced based on the deformed vector outline image at step 904 and average shape dissimilarity between the deformed vector outline image and the corresponding ASCII picture is determined at step 905. For example, the image 404 shown in FIG. 4 is an ASCII picture matched with the deformed image 403.

The steps 903-905 are performed iteratively until it is determined in step 906 that the iterative deformation is to be terminated. The above described process may be referred as discrete optimization. In each iterative deformation during the optimization, one vertex in the vector outline image is selected randomly, and its position is displaced randomly with a distance of at most the length of the longer side of the character image. Then, all affected grid cells due to this displacement are identified and best-matched with an ASCII character again. For each deformation, an average shape dissimilarity value is obtained. In this case, it may be determined in the step 906 that whether the obtained average shape dissimilarity value is lower than previous ones. If a predetermined number of average shape dissimilarity values obtained consecutively are not lower than each of the previous ones, it may be determined in the step 906 that the optimization should be terminated.

Alternatively, it may be determined at step 906 that the vector outline image has been deformed for predetermined times. If it is the case, the optimization is to be terminated.

After the termination is determined in the step 906, an ASCII picture having the minimum average shape dissimilarity with corresponding vector outline image is selected from the all the produced ASCII pictures at step 907 so as to approximate the original image. For example, after the image has been deformed for a predetermined times, the optimal image 405 is selected to output.

Embodiment 3

In the above second embodiment, however, unconstrained deformation may destroy a global structure of the input image. In this case, a third embodiment is proposed to quantify the deformation and select an ASCII picture having a minimum deformation value.

Figure 10:
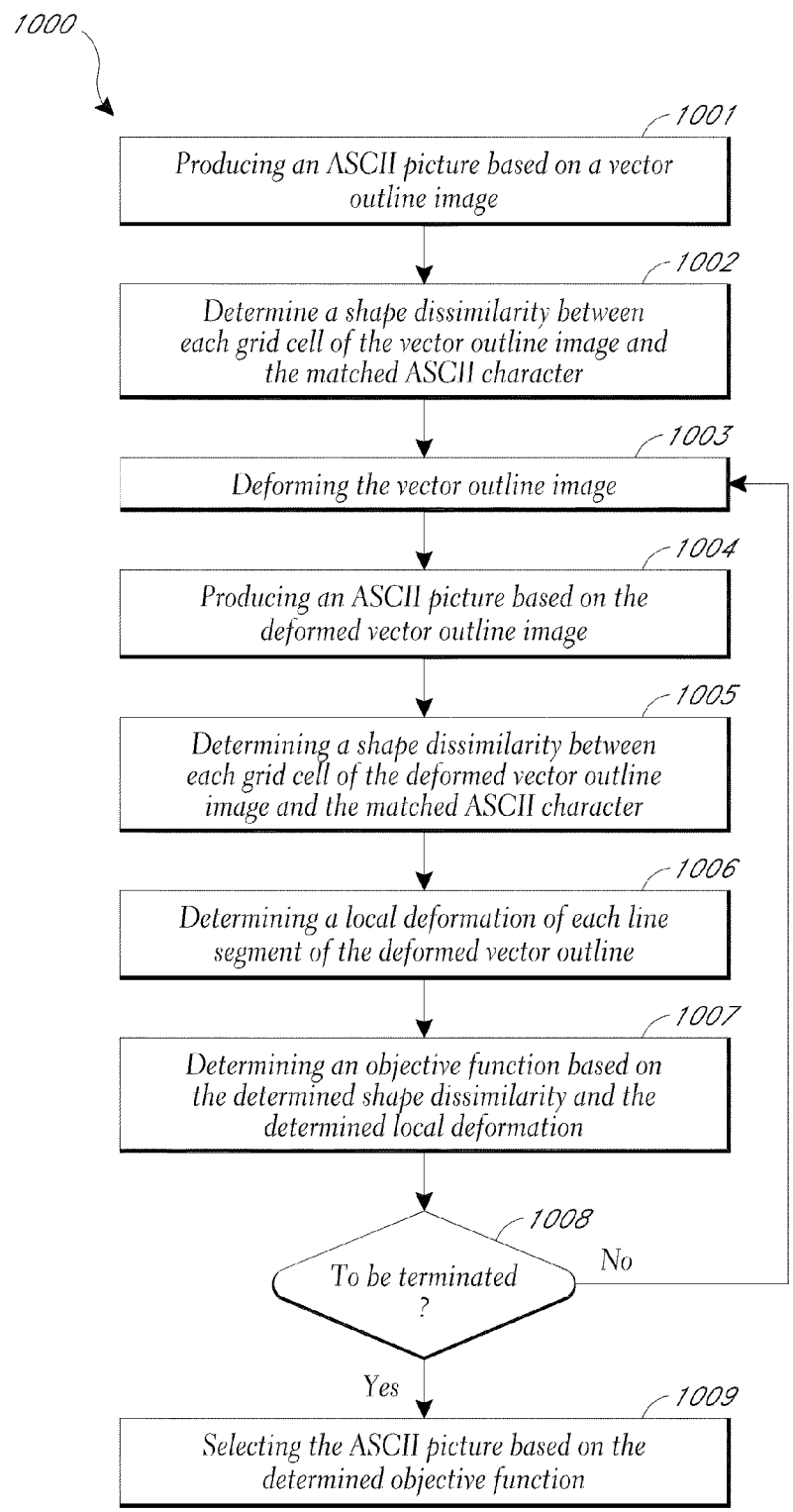
FIG. 10 illustrates a flowchart of the method according to a third embodiment of the present application.

In this embodiment, both the deformation of vectorized image and the dissimilarity between characters and the deformed picture are considered. A flow chart of the method 1000 according to the third embodiment is illustratively shown in FIG. 10. The third embodiment is similar to the second embodiment, except for the steps 1006 and 1007. In the step 1006, a local deformation of each line segment of the deformed vector outline is determined. In the step 1007, an objective function is calculated based on the shape dissimilarity and the local deformation. The two steps will be described below. Besides, in the this embodiment, a shape dissimilarity between each grid cell of the vector outline image and the matched ASCII character, instead of an average dissimilarity for the whole vector outline image, is determined in steps 1002 and 1005 and used in step 1007.

Local Constraint

Figure 7A:
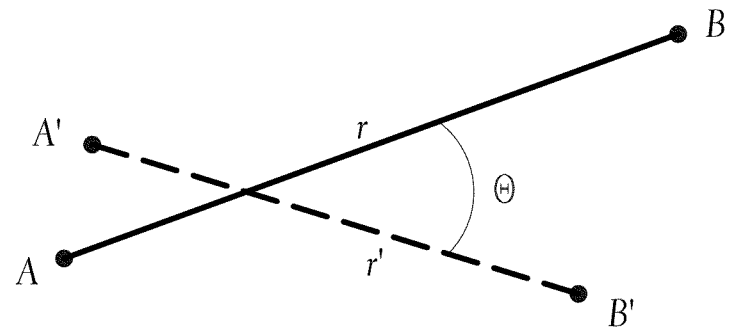
FIGS. 7(a) and 7(b) illustrate deformation of a line in the method according to the present application.
Figure 7B:
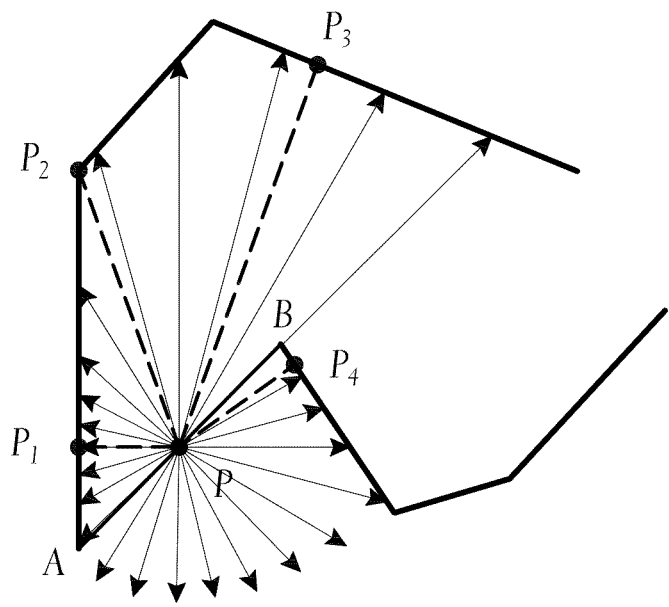

According to the embodiment, the deformation of the vector outline image is determined based on each line segment in the image. The local deformation of each line segment, in terms of orientation and scale, is determined as below. For an original line segment AB (hereinafter referred as line segment $L_i$) deformed to A'B' as shown in FIG. 7(a), regardless of the global translation during the deformation, the local deformation of the line segment $l_i$ may be measured as follow:

$$D_{local}(L_i) = \max\{V_\theta(L_i), V_r(L_i)\}, \quad (2)$$

where $V_\theta(L_i) = \exp(\lambda_1 \theta)$, and $V_r(L_i) = \max\left\{\exp(\lambda_2|r' - r|), \exp\left(\frac{\lambda_3 \max\{r, r'\}}{\min\{r, r'\}}\right)\right\}.$ Here, $V_\theta$ and $V_r$ are the deformation values with respect to orientation and scale respectively, and the larger value of them finally determines the local deformation of a line segment. $\theta \in [0, \pi]$ is the angle between the original line segment and the deformed line segment. r and r' denote the lengths of the original line segment and the deformed line segment, respectively. Parameters $\lambda_1$, $\lambda_2$, and $\lambda_3$ are weights, which may be empirically set to values of $8/\pi$, $2/\min\{T_w,T_h\}$, and 0.5, respectively. The function exp( ) is to make sure that deformation value would be not less than 1.0. The weights $\lambda_1$, $\lambda_2$, and $\lambda_3$ are used to control the deformation due to the variation of angle, absolute length, and relative length, respectively. The variation of absolute length is evaluated by using the distance |r'−r|, and variation of relative length using the times of length $$\frac{\max\{r, r'\}}{\min\{r, r'\}}.$$

Thus the local deformation value for each line segment is obtained.

Accordingly, a local deformation value of image content in a grid cell j, $D_{local}^{j}$, may be determined as follow.

$$D_{local}^{j} = \sum_{L_i \in \{L\}} \tilde{l}_i D_{local}(L_i), \text{ where } \tilde{l}_i = \frac{l_i}{\sum_{L_i \in \{L\}} l_i}. \quad (3)$$

In particular, all line segments $L_i$ intersecting the current cell j are identified at first and denoted as a set $\{L\}$. $l_i$ is the length of the part of line segment $L_i$ occupied by the grid cell j. Then, the local deformation value of cell j may be calculated as the weighted average of deformation values of involved line segments.

In this case, in step 1007, an energy E may be defined as an overall objective function as follow to evaluate each ASCII picture produced corresponding to each deformed image, $$E = \frac{1}{K} \sum_{j=1}^{m} D_{AISS}^{j} \times D_{local}^{j}, \quad (4)$$

where m is the total number of character cells, and K is the number of non-empty cells and used as the normalization factor. $D_{AISS}^{j}$ is the dissimilarity between j-th cell content and its best-matched character, as defined in Equation (1) and determined in the step 1002 or 1005. The term $D_{local}^{j}$ is the local deformation value of the j-th cell determined in the step 1006. It is understood that, for the original vector outline image which is not deformed, the term $D_{local}^{j}$ may be deemed to be equal to 1.

Similarly, the steps 1003-1007 are performed iteratively until it is determined in step 1008 that the iterative deformation is to be terminated. The above described process may be referred as discrete optimization. In each iterative deformation during the optimization, one vertex in the vector outline image is selected randomly, and its position is displaced randomly with a distance of at most the length of the longer side of the character image. Then, all affected grid cells due to this displacement are identified and best-matched with an ASCII character again. For each deformation, an energy value E is obtained. In this case, a simulated annealing scheme may also be used. In particular, in the step 1008, it is determined if the recomputed E is reduced. If it is the case, the displacement is accepted. Otherwise, a transition probability $P_r = \exp(-\partial/t)$ may be used to make decision, where $\partial$ is the energy difference between two iterations; $t = 0.2 t_a c^{0.997}$ is the temperature;

c is the iteration index; $t_a$ is an initial average matching error of all grid cells. If $P_r$ is smaller than a random number in [0, 1], this displacement is accepted; otherwise, it is rejected. The optimization is terminated whenever E is not reduced for $c_o$ consecutive iterations. For example, the parameter $c_o$ may be selected to be 5000 in this implementation. Thus, if the energy E is not reduced for $c_o$ consecutive iterations, it may be determined in the step 1008 that the optimization should be terminated.

Alternatively, it may be determined at step 1008 that the vector outline image has been deformed for predetermined times. If it is the case, the optimization is to be terminated.

After the termination is determined in the step 1008, the ASCII picture corresponding to the minimum energy value E may be selected at step 1009 to approximate the original image.

Embodiment 4

Figure 8A:
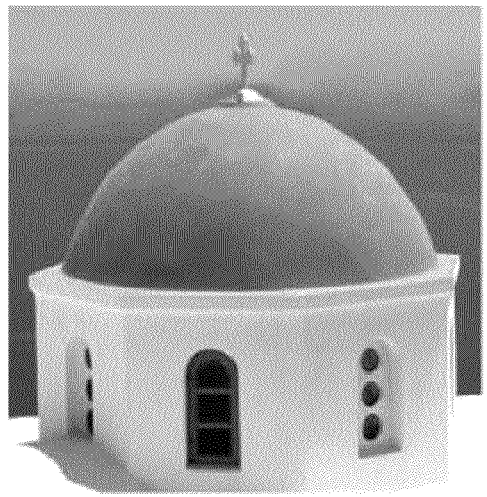
FIGS. 8(a), 8(b), 8(c), and 8(d) illustrate constrained deformation of an image in the method according to the present application.
Figure 8B:
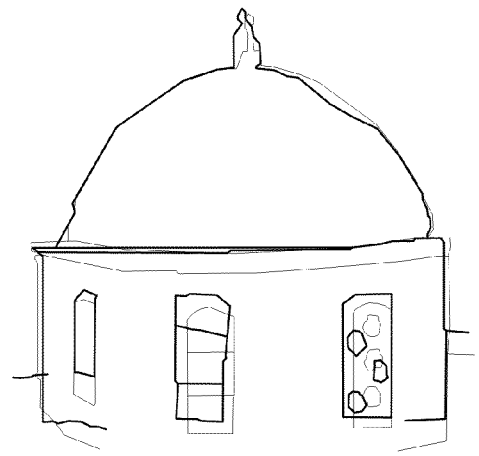
Figure 8C:
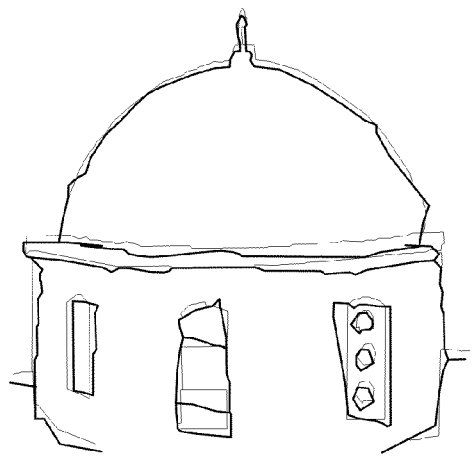
Figure 8D:
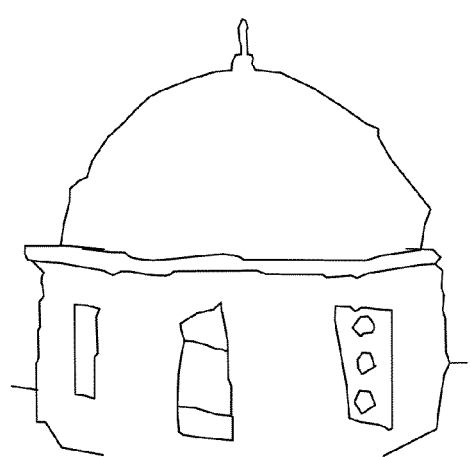

The local deformation constraint as discussed above prevents the over-deformation in local scale. However, it cannot avoid the over-deformation in a global scale. For example, as shown in FIG. 8(b), three circular windows drift away from their original locations and destroy the layout, even though each of them is not over-deformed in local sense. In this sense, the global deformation cannot be identified by the local deformation value.

To constrain the deformation in a global scale, a fourth embodiment according to the present application, including a 2D accessibility constraint, is further proposed so that the relative orientation and position between the current line segment and its surrounding line segments are maintained.

Figure 11:
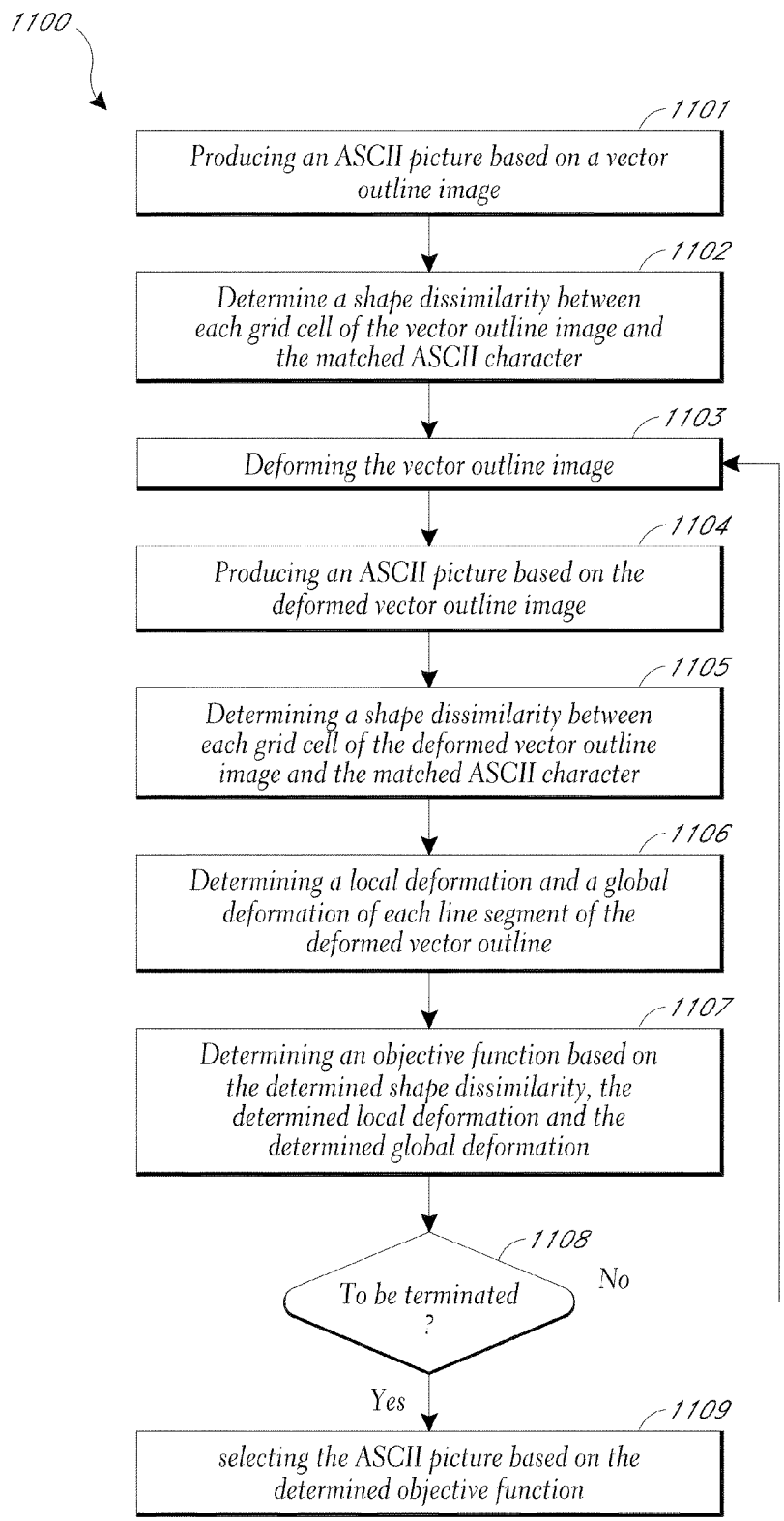
FIG. 11 illustrates a flowchart of the method according to a fourth embodiment of the present application.

Referring to FIG. 11, a flow chart of the method 1000 according to the fourth embodiment is illustratively shown. The fourth embodiment is similar to the third embodiment, except for the step 1106 in which a global deformation of each line segment of the deformed vector outline is further determined, which will be described below.

Global Constraint

To compute the global deformation of a line segment in the deformed image, say AB in FIG. 8(b), multiple rays are shot from the midpoint P of AB towards the surrounding circle in order to determine the closest surrounding line segments. For each intersected line segment, a nearest point $P_k$ on it to P may be determined. Then the accessibility may be computed. For example, the global deformation $D_{access}(L_i)$ may be calculated as $$D_{access}(L_i) = \sum_{k=1}^{nl} w_k D_{local}(PP_k), \quad (5)$$

where nl is the total number of intersected line segments for the point P. $D_{local}(PP_k)$ is the local deformation of the line segment $PP_k$ as defined in Equation (2); $w_k$ is the weight and may be computed as the normalized distance $w_k = |PP_k|/(\sum_{k=1}^{nl}|PP_k|)$. The weight value is higher when the corresponding point $P_k$ is closer to P.

Hence, the overall deformation value may be determined by $$D_{deform}(L_i) = \max\{D_{local}(L_i), D_{access}(L_i)\}. \quad (6)$$

With the above metric, the deformation value for each line segment of the deformed polyline may be evaluated. Thus, a deformation value of image content in a grid cell j, $D_{deform}^{j}$, may be determined. In particular, all line segments intersecting the current cell j are identified at first and denoted as a set $\{L\}$. $l_i$ is the length of the part of line segment $L_i$ occupied by the grid cell j. Then, the deformation value of cell j may be calculated as the weighted average of deformation values of involved line segments, $$D_{deform}^{j} = \sum_{L_i \in \{L\}} \tilde{l}_i D_{deform}(L_i), \text{ where } \tilde{l}_i = \frac{l_i}{\sum_{L_i \in \{L\}} l_i}. \quad (7)$$

In this case, in the step 1107, the energy E, also referred as the objective function, may be defined as an overall objective function as follow, $$E = \frac{1}{K} \sum_{j=1}^{m} D_{AISS}^{j} \times D_{deform}^{j}, \quad (8)$$

where m is the total number of character cells, and K is the number of non-empty cells and used as the normalization factor. $D_{AISS}^{j}$ is the dissimilarity between j-th cell content and its best-matched character, as defined in Equation (1). The term $D_{deform}^{j}$ is the deformation value of the j-th cell.

After an optimization as stated with reference to the second embodiment, upon the termination determined at the step 1108, the ASCII picture corresponding to the minimum energy value E may be selected at step 1109 to approximate the original image.

Hereinabove, illustrative embodiments of the method for producing structure-based ASCII pictures according to the present application are described. The device for producing structure-based ASCII pictures according to the present application will be described as below.

Figure 12:
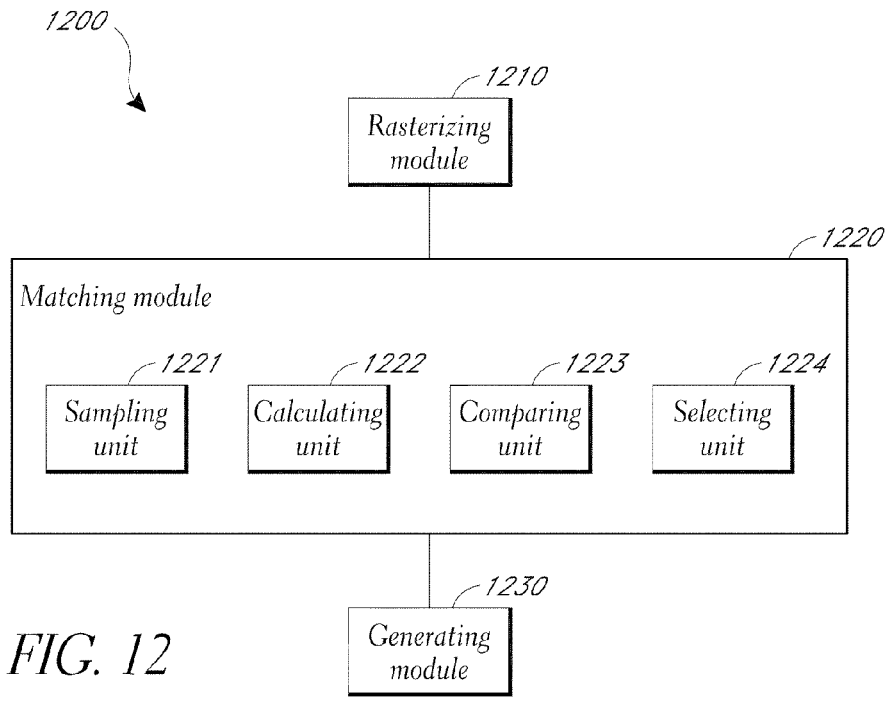
FIG. 12 illustrates a device according to an embodiment of the present application.

A device 1200 for producing structure-based ASCII pictures according to an embodiment of the present application is illustratively shown in FIG. 12. As shown, the device 1200 comprising a rasterizing module 1210 configured to rasterize the vector outline image into a plurality of grid cells, at least one of which has a reference image; a matching module 1220 configured to match each reference image with an ASCII character based on log-polar histograms thereof; and a generating module 1230 configured to gather all matched ASCII characters to generate the ASCII picture.

The matching module 1220 may comprise a sampling unit 1221 configured to sample the reference image and all ASCII characters by using a same layout pattern; a calculating unit 1222 configured to determine a shape dissimilarity between the reference image and each of the ASCII characters; and a comparing unit 1223 configured to compare the determined shape dissimilarity one another; and a selecting unit 1224 configured to select an ASCII character corresponding to a minimum shape dissimilarity with the reference image to match the reference image.

The calculating unit 1222 may be further configured to calculate a feature vector of each sample point in both the reference image and each of the ASCII characters based on the log-polar histograms thereof; and to determine the shape dissimilarity between the reference image and each of the ASCII characters based on the determined feature vector.

The rasterizing unit 1210 may be further configured to rasterize the vector outline image into the plurality of grid cells based on a target resolution as well as a height and a width of ASCII character selected to be used; and to render the vector outline image with a line having a same thickness as that of the ASCII character by extracting a midline of the vector outline image.

The feature vector of an i-th sample point p may comprise a plurality of component, each of which represents a grayness value at a set of points in a log-polar window associated with the sample point p.

The shape dissimilarity between a grid cell and an ASCII character may be determined based on feature vectors corresponding to the sample points in the grid cell and the ASCII character.

The calculating unit 1222 may be further configured to determine a plurality of first feature vectors corresponding to the sample points in the grid cell; determine a plurality of second feature vectors corresponding to the sample points the ASCII character; calculate a norm of a difference between the first and second feature vectors; and normalize the norm to form the shape dissimilarity.

Figure 13:
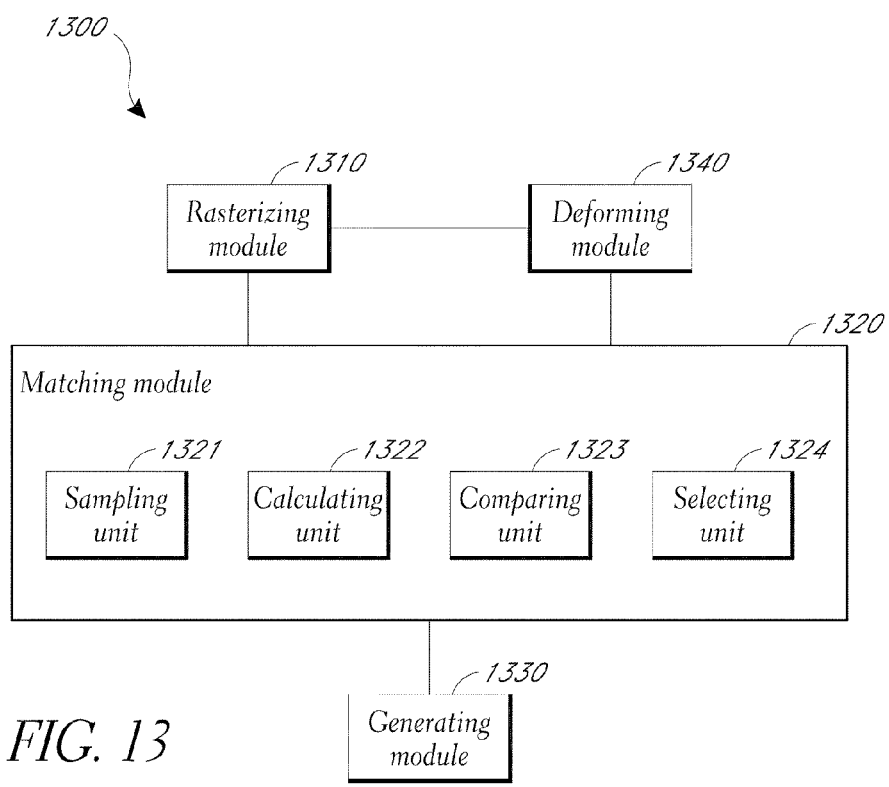
FIG. 13 illustrates a device according to another embodiment of the present application.

A device 1300 for producing structure-based ASCII pictures according to another embodiment of the present application is illustratively shown in FIG. 13. Same or similar components in the two embodiments are illustrated with similar reference numbers. As shown, the device 1300 further comprises a deforming module 1340 configured to deform the vector outline image iteratively.

In this embodiment, the calculating unit 1322 may be further configured to determine an average shape dissimilarity of the vector outline image with its matched ASCII picture; determine an average shape dissimilarity of each deformed image with its matched ASCII picture; and select an ASCII picture corresponding to a minimum average shape dissimilarity value. Alternatively, the calculating unit 1322 may be further configured to determine a local deformation value of each deformed image; and select an ASCII picture based on both the shape dissimilarity and the local deformation value. Alternatively, the calculating unit 1322 may be further configured to determine a final deformation value of each deformed image according to a larger one in a local deformation value and a global deformed value of each line segment in the deformed image; and select an ASCII picture based on the shape dissimilarity and the final deformation value.

Figure 15:
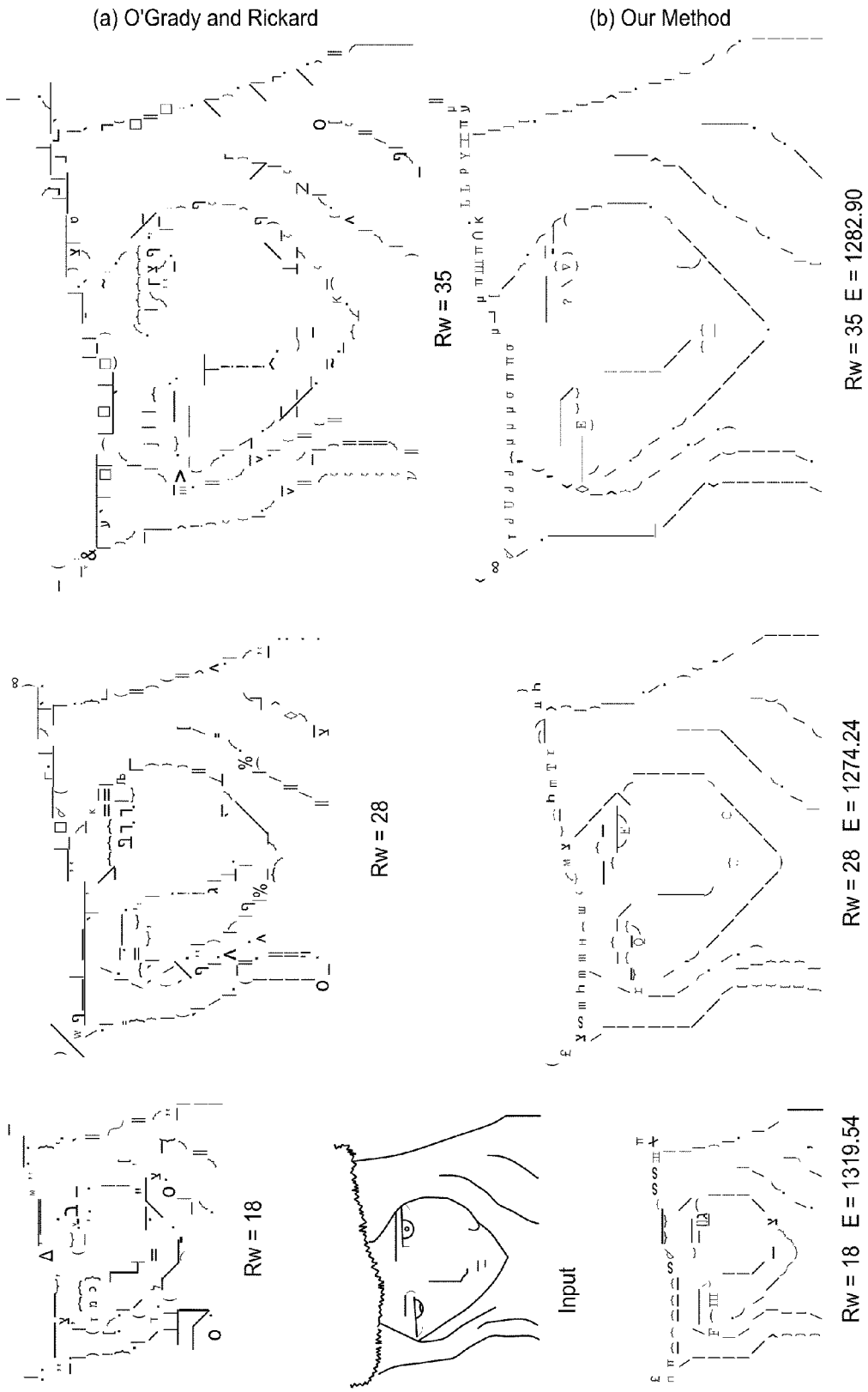
FIG. 15 illustrates a comparison of the method according to the present application and a method in the prior art.

It should be noted that the energy values of different text resolutions are directly comparable, as the function is normalized. Referring to FIG. 15, results in three text resolutions generated by the method proposed herein and prior arts are shown along with their energies. The middle one (28×21) with the smallest energy in the lower line corresponds to the most pleasant result generated by the proposed method, while the visually poor result on the left has a relatively larger energy. The results in the upper line generated by previous method are obviously poorer than the lower ones.

Figure 14:
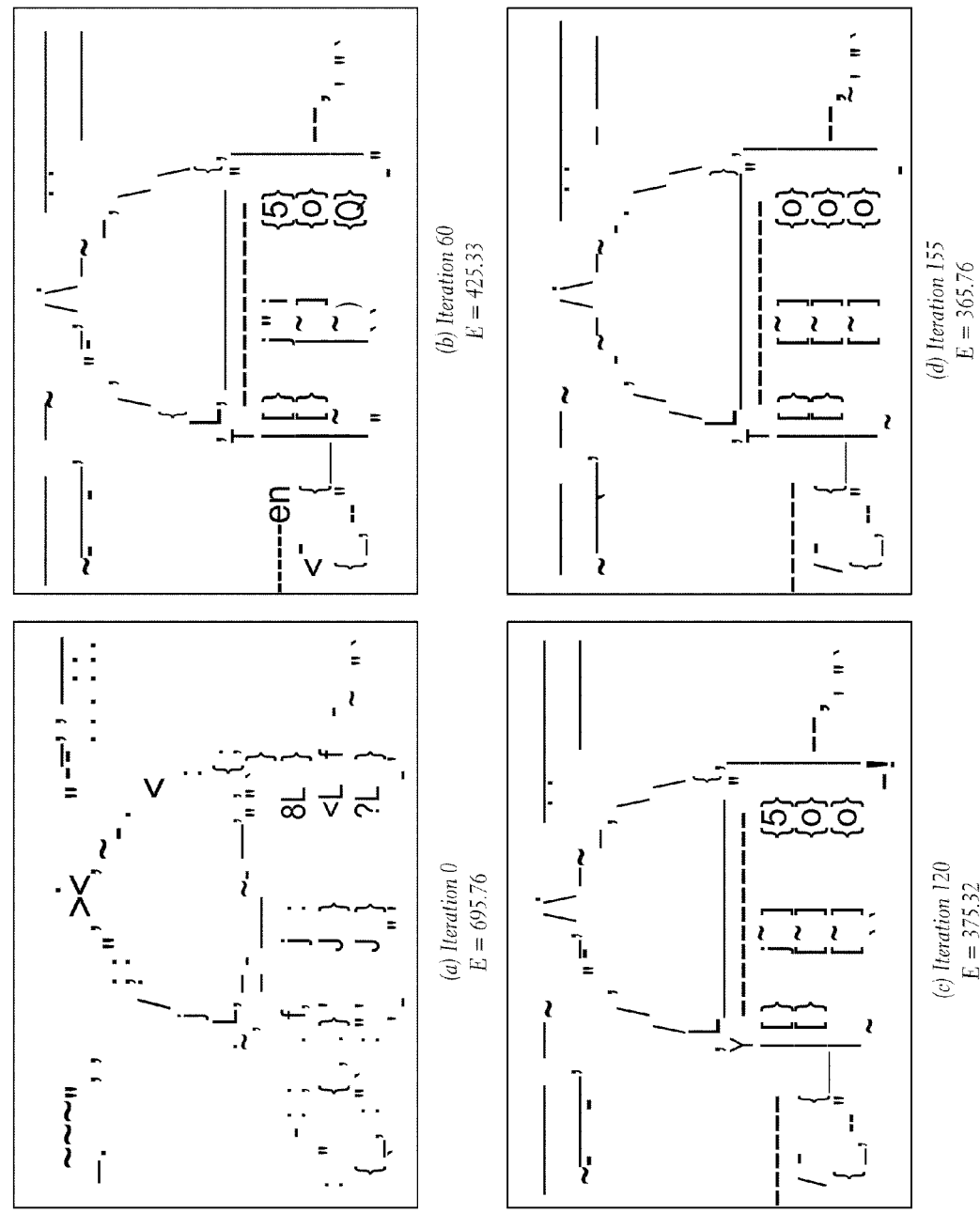
FIG. 14 illustrates intermediate results obtained during iteratively deformation.

In our current implementation, a simulated annealing is employed to solve this discrete optimization problem. Other tools for solving discrete optimization may also be applicable. FIG. 14 shows the intermediate results along with their energies during optimization. As the iteration time increases, the energy reduces and the visual quality of ASCII art improves accordingly.

Users may opt for allowing the system to determine the optimal text resolution by choosing the minimized objective values among results of multiple resolutions, as the objective function is normalized to the text resolution.

The invention claimed is:
1. A method for producing an ASCII picture from a vector outline image, comprising:
    rasterizing the vector outline image into a plurality of grid cells, at least one of which has a reference image;

matching each reference image with an ASCII character based on log-polar histograms thereof; and
gathering all matched ASCII characters to form the ASCII picture.

2. The method of claim 1, wherein the matching comprises:
sampling the reference image and all ASCII characters by using a same layout pattern;
determining a shape dissimilarity between the reference image and each of the ASCII characters; and
selecting an ASCII character minimizing the shape dissimilarity with the reference image to match the reference image.

3. The method of claim 2, the determining further comprising:
determining a feature vector of each sample point in both the reference image and each of the ASCII characters based on the log-polar histograms thereof; and
determining the shape dissimilarity between the reference image and each of the ASCII characters based on the determined feature vector.

4. The method of claim 1, wherein the vector outline image is generated by the steps of:
converting an image to be processed into an outline image; and
vectorizing the outline image to generate the vector outline image.

5. The method of claim 1, wherein the rasterizing comprises:
rasterizing the vector outline image into the plurality of grid cells based on a target resolution as well as a height and a width of ASCII character selected to be used; and
rendering the vector outline image with a line having a same thickness as that of the ASCII character by extracting a midline of the vector outline image.

6. The method of claim 3, wherein the feature vector of each sample point comprises a plurality of component, each of which represents a grayness value at a set of points in a log-polar window associated with the sample point.

7. The method of claim 6, wherein the shape dissimilarity between a grid cell and an ASCII character is determined based on feature vectors corresponding to the sample points in the grid cell and the ASCII character.

8. The method of claim 7, wherein the shape dissimilarity between a grid cell and an ASCII character is determined by following steps:
determining a plurality of first feature vectors corresponding to the sample points in the grid cell;
determining a plurality of second feature vectors corresponding to the sample points the ASCII character;
calculating a norm of a difference between the first and second feature vectors; and
normalizing the norm to form the shape dissimilarity.

9. The method of claim 2, further comprising:
determining an average shape dissimilarity of the vector outline image with its matched ASCII picture;
deforming the vector outline image iteratively;
determining an average shape dissimilarity of each deformed image with its matched ASCII picture; and
selecting an ASCII picture corresponding to a minimum average shape dissimilarity.

10. The method of claim 2, further comprising:
deforming the vector outline image iteratively;
determining a local deformation value of each deformed image; and
selecting an ASCII picture based on both the shape dissimilarity and the local deformation value.

11. The method of claim 2, further comprising:
deforming the vector outline image iteratively;
determining a final deformation value of each deformed image according to a larger one in a local deformation value and a global deformed value of each line segment in the deformed image; and
selecting an ASCII picture based on the shape dissimilarity and the final deformation value.

12. A device for producing an ASCII picture from a vector outline image, comprising:
a rasterizing module configured to rasterize the vector outline image into a plurality of grid cells, at least one of which has a reference image;
a matching module configured to match each reference image with an ASCII character based on log-polar histograms thereof; and
a generating module configured to gather all matched ASCII characters to generate the ASCII picture.

13. The device of claim 12, wherein the matching module comprises:
a sampling unit configured to sample the reference image and all ASCII characters by using a same layout pattern;
a calculating unit configured to determine a shape dissimilarity between the reference image and each of the ASCII characters;
a comparing unit configured to compare the determined shape dissimilarity one another; and
a selecting unit configured to select an ASCII character corresponding to a minimum shape dissimilarity with the reference image to match the reference image.

14. The device of claim 13, wherein the calculating unit is further configured to calculate a feature vector of each sample point in both the reference image and each of the ASCII characters based on the log-polar histograms thereof; and to determine the shape dissimilarity between the reference image and each of the ASCII characters based on the determined feature vector.

15. The device of claim 12, wherein the rasterizing unit is further configured to rasterize the vector outline image into the plurality of grid cells based on a target resolution as well as a height and a width of ASCII character selected to be used; and to render the vector outline image with a line having a same thickness as that of the ASCII character by extracting a midline of the vector outline image.

16. The device of claim 14, wherein the feature vector of each sample point comprises a plurality of component, each of which represents a grayness value at a set of points in a log-polar window associated with the sample point.

17. The device of claim 16, wherein the shape dissimilarity between a grid cell and an ASCII character is determined based on feature vectors corresponding to the sample points in the grid cell and the ASCII character.

18. The device of claim 17, wherein the calculating unit is further configured to determine a plurality of first feature vectors corresponding to the sample points in the grid cell; determine a plurality of second feature vectors corresponding to the sample points the ASCII character; calculate a norm of a difference between the first and second feature vectors; and normalize the norm to form the shape dissimilarity.

19. The device of claim 13, further comprising a deforming module configured to deform the vector outline image iteratively,
wherein the calculating unit is further configured to determine an average shape dissimilarity of the vector outline image with its matched ASCII picture; determine an average shape dissimilarity of each deformed image with its matched ASCII picture; and select an ASCII picture corresponding to a minimum average shape dissimilarity.

20. The device of claim 13, further comprising a deforming module configured to deform the vector outline image iteratively,
   wherein the calculating unit is further configured to determine a local deformation value of each deformed image; and select an ASCII picture based on both the shape dissimilarity and the local deformation value.

21. The device of claim 13, further comprising a deforming module configured to deform the vector outline image iteratively,
   wherein the calculating unit is further configured to determine a final deformation value of each deformed image according to a larger one in a local deformation value and a global deformed value of each line segment in the deformed image; and to select an ASCII picture based on the shape dissimilarity and the final deformation value.

* * * * *